US005548086A

United States Patent [19]
Greenfield et al.

[11] Patent Number: 5,548,086
[45] Date of Patent: Aug. 20, 1996

[54] LOCAL DISTRIBUTION UTILITY CENTER FOR A RAISED FLOOR

[75] Inventors: Sherwood S. Greenfield, Charlotte; Kevin J. Voll, Matthews, both of N.C.

[73] Assignee: The Whitaker Corporation, Wilmington, Del.

[21] Appl. No.: 361,640

[22] Filed: Dec. 22, 1994

[51] Int. Cl.⁶ .................................................. H02G 3/00
[52] U.S. Cl. ............................... 174/48; 174/59; 174/60; 361/601
[58] Field of Search .............................. 174/48, 59, 60; 52/220.1; 361/601, 622, 627, 641, 826

[56] References Cited

U.S. PATENT DOCUMENTS

| 3,809,966 | 5/1974 | Tirrell et al. | 317/117 |
| 4,312,552 | 1/1982 | Hughes et al. | 339/36 |
| 4,721,476 | 1/1988 | Zeliff et al. | 439/142 |
| 4,993,970 | 2/1991 | Littrell | 439/535 |
| 5,326,934 | 7/1994 | LeMaster et al. | 174/59 |

OTHER PUBLICATIONS

Procomm Enterprises Magazine, Flexible Wiring System, Apr. 1990, pp. 1–4.

Primary Examiner—Kristine L. Kincaid
Assistant Examiner—Michael J. Cornelison

[57] ABSTRACT

A utility center for use in combination with a raised floor for accommodating data and telecommunications wiring in an area between the raised floor and a supporting subfloor is provided. The utility center is located intermediate a communications wiring closet and at least one workstation of a workgroup for distributing wiring to communications equipment of the at least one workstation. The utility center includes a base mounted on the subfloor. The base includes an access opening therein for receiving wiring from the communications wiring closet, and for delivering wiring from the utility center to the at least one workstation of the workgroup. A vertical support is connected to the base. A distribution panel is carried by the support for operatively interconnecting wiring of the wiring closet and the communications equipment of the at least one workstation.

10 Claims, 7 Drawing Sheets

LOCAL DISTRIBUTION UTILITY CENTER FOR A RAISED FLOOR

TECHNICAL FIELD AND BACKGROUND OF THE INVENTION

This invention relates to a local distribution utility center for a raised floor, and method of providing communications services to a workgroup. The invention is especially applicable to communications wiring for servicing data and telecommunications equipment of a centralized office workgroup. Such equipment typically includes a telephone, FAX machine, modem or central computer connection, printer connection, and/or local area network. The workgroup may include any number of persons with common needs and interests, and who are located in relatively close proximity to each other in an office. For example, the workgroup may include 8 to 12 workstations assigned to work collectively on a particular project.

Since the location and equipment needs of the workgroup are generally temporary and often changing, there has developed a need in the industry for a wiring system which will readily accommodate the addition of workstations to the workgroup, added equipment, relocation, and other changes. In the past, accommodating such changes meant abandoning old wiring, rewiring with new wiring, clogged and unusable wiring pathways, and a considerable amount of labor and cost. Moreover, since each manufacturer's office equipment typically had its own proprietary wiring scheme, switching from one manufacturer to another generally required a complete rewiring of all affected workstations.

In response to these concerns and other developments in the industry, the concept of "structured wiring" emerged. Basically, structured wiring means that the wiring of every workstation follows a fixed plan. The three basic characteristics of structured wiring include:

(1) It is application-independent.

(2) Every workstation is wired the same.

(3) All workstations are star-wired to a central distribution point, such as a main wiring closet.

An "application-independent" wiring system enables the wiring system to handle all communication services and equipment that the office worker may need over the life of the wiring. In theory, re-wiring should never be needed in a structured system, since the wiring is already in place to accommodate any service combination. Workers are thereby free to move workstations throughout the work place without extensive labor and cost.

Star-wiring the workstations enables quick and efficient relocation and other workstation changes, since all service switching can be done at one distribution point (or at the most, several distribution points if the changes encompass several star-wired zones). Star-wiring also makes it easier to access and troubleshoot the wiring of a data network from one central location. Moreover, new services can be easily added and connected into the system. Most new network equipment has already been designed to drop into a star-wired topology.

Because of standardization of wiring in the industry and the acceptance of wiring standardization by communications equipment manufacturers, structured wiring has developed into a convenient and workable system. Standardization began with the 1991 release of the EIA/TIA 568 "Commercial Building Telecommunications Wiring Standard". In addition to standardizing the types and specifications of wiring components, the EIA/TIA Standard set guidelines around which most of today's structured wiring systems have been designed. The Standard describes a simple horizontal system that connects to the network backbone wiring or data equipment in a wiring closet, and consists of individual cable runs from the closet to each workstation outlet port. FIG. 7 shows how this conventional system would apply to a typical cluster of eight offices.

Problems With Conventional Structured Wiring

While the EIA/TIA Standard and the structured wiring concept go a long way toward solving many of the wiring problems of the past, much of the industry has interpreted the Standard too rigidly and failed to recognize the full potential of this system. One of the more common misunderstandings is that the Standard requires "dedicated" cable runs from the wiring closet to each workstation outlet port for each communications service.

Although dedicated wiring may be sufficient for a single telephone and a single data service per workstation, in today's office environment, workers generally require many additional services. For example, a modern workstation may be wired for telephone, FAX, modem or central computer connection, printer connection, and a local area network. The typical workstation needs anywhere from three to six service connections per desk.

With dedicated wiring, every workstation is wired with individual cable runs from the wiring closet to the workstation for each of the desired services. An extremely large number of cable runs are thus required to accommodate one or more workgroups in a given area. As shown in FIG. 7, each line represents a bundle of three to six cables. In order to distribute the cables about the floor of the office, considerable space must be available in cable trays, conduits, or pathways that lead from the wiring closet to the workstations. In an existing building, this space is generally not available.

Terminating all of these cable runs into one small wiring closet can also be a problem. All of the cables must be terminated to distribution panels that patch over to other distributions panels. In order to realize the advantages of a star-wired configuration, the mounting of panels and the routing of patch cables must allow easy access for troubleshooting and the administration of future moves or additions. A growing conglomeration of network concentrators, file servers, controllers, and other communications equipment must also be mounted somewhere in the room, again with access for maintenance. The heat build-up from the equipment must somehow be dissipated.

Again, this requires space which probably does not exist in a previously wired building. Even in a new building, unless it was designed with the foresight and commitment to dedicate valuable floor space to a relatively large and spacious wiring closet, chances are that the closet is still inadequate, or will soon become inadequate.

In addition, long cable runs and crowded wiring closets can limit the capability of the wiring to handle high speed data. Network equipment designers continually fight the battle between signal loss and noise build-up. Long cable runs attenuate the signals and hamper the ability of the receiving equipment to correctly interpret the signal from background noise. Moreover, commonly used unshielded cabling is more vulnerable to noise than shielded cabling. Crowded wiring closets add to the problem, since the build-up of electrical fields radiating from closely-packed wiring and equipment can also cause interferences.

Thus, in an open office environment where workstations are intentionally non-permanent, the problems of how to effectively interface long, fixed cable runs with movable workstations, and how to avoid extensive wiring rerouting or waste when the workstations are moved must be addressed and resolved.

The Local Distribution Alternative

The present invention addresses the above problems of standard wiring, and serves the needs of a modern workgroup through the concept of local distribution. The invention is applicable in combination with a raised floor, such as that disclosed in the Applicant's pending patent application, U.S. Ser. No. 8/161,977, now U.S. Pat. No. 5,440,841.

According to the invention, all of the panels and equipment associated with a workgroup are condensed into a single local distribution utility center located on the floor near the workgroup. FIG. 8 shows the same office cluster illustrated in FIG. 7, but wired using local distribution.

The invention frees up considerable space in the wiring closet, and drastically shortens the cable runs to the workstations, thereby gaining valuable performance margin for high speed applications. The invention reduces the amount and cost of the workstation cabling, and adds flexibility to the workgroup to locally administer moves or changes. Moreover, with short interconnections between workstations and distribution center, moving workstations is made easier with minimum disruption and cable rerouting. The workgroup can readily track down local network problems, and isolate itself from other network problems if necessary.

SUMMARY OF THE INVENTION

Therefore, it is an object of the invention to provide a utility center for use in a local distribution wiring system.

It is another object of the invention to provide a utility center which permits easy relocation of workstations within an office environment.

It is another object of the invention to provide a utility center which is relatively small, lightweight, and easy to move.

It is another object of the invention to provide a utility center which allows added space in the wiring closet, and shortens cable runs to the workstations of the workgroup.

It is another object of the invention to provide a utility center which increases performance margin for high speed applications in communications services.

It is another object of the invention to provide a utility center which reduces the amount and cost of the workstation cabling.

It is another object of the invention to provide a utility center which allows a workgroup to readily track down local network problems, and to isolate itself from other network problems if necessary.

It is another object of the invention to provide a method of providing communications services to a workgroup.

These and other objects of the present invention are achieved in the preferred embodiments disclosed below by providing a utility center for use in combination with a raised floor for accommodating data and telecommunications wiring in an area between the raised floor and a supporting subfloor. The utility center is located intermediate a communications wiring closet and at least one workstation of a workgroup for distributing wiring to communications equipment of the at least one workstation. The utility center includes a base mounted on the subfloor. The base includes an access opening therein for receiving wiring from the communications wiring closet, and for delivering wiring from the utility center to the at least one workstation of the workgroup. A vertical support is connected to the base. A distribution panel is carried by the support for operatively interconnecting wiring of the wiring closet and the communications equipment of the at least one workstation.

According to one preferred embodiment of the invention, the base includes a plurality of legs for vertically spacing the utility center above the supporting subfloor.

According to another preferred embodiment of the invention, the raised floor includes a plurality of floor modules, and the base includes at least one of the floor modules of the raised floor.

According to yet another preferred embodiment of the invention, first and second opposing side walls are connected to the base of the utility center.

According to yet another preferred embodiment of the invention, the vertical support means includes first and second support rods connected to respective side walls of the utility center for carrying the distribution panel means.

According to yet another preferred embodiment of the invention, a top wall is connected to the first and second side walls of the utility center.

According to yet another preferred embodiment of the invention, front and back walls are connected to the first and second side walls of the utility center for allowing convenient access to the distribution panel means.

An embodiment of the method according to the invention includes the steps of delivering communications wiring beneath a raised floor from a remote wiring closet to a local distribution utility center mounted on a supporting subfloor. The method further includes the step of delivering distribution wiring from the utility center to the at least one workstation of the workgroup, and operatively interconnecting the communications wiring of the wiring closet and the distribution wiring of the at least one workstation to service communications equipment associated with the workgroup.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
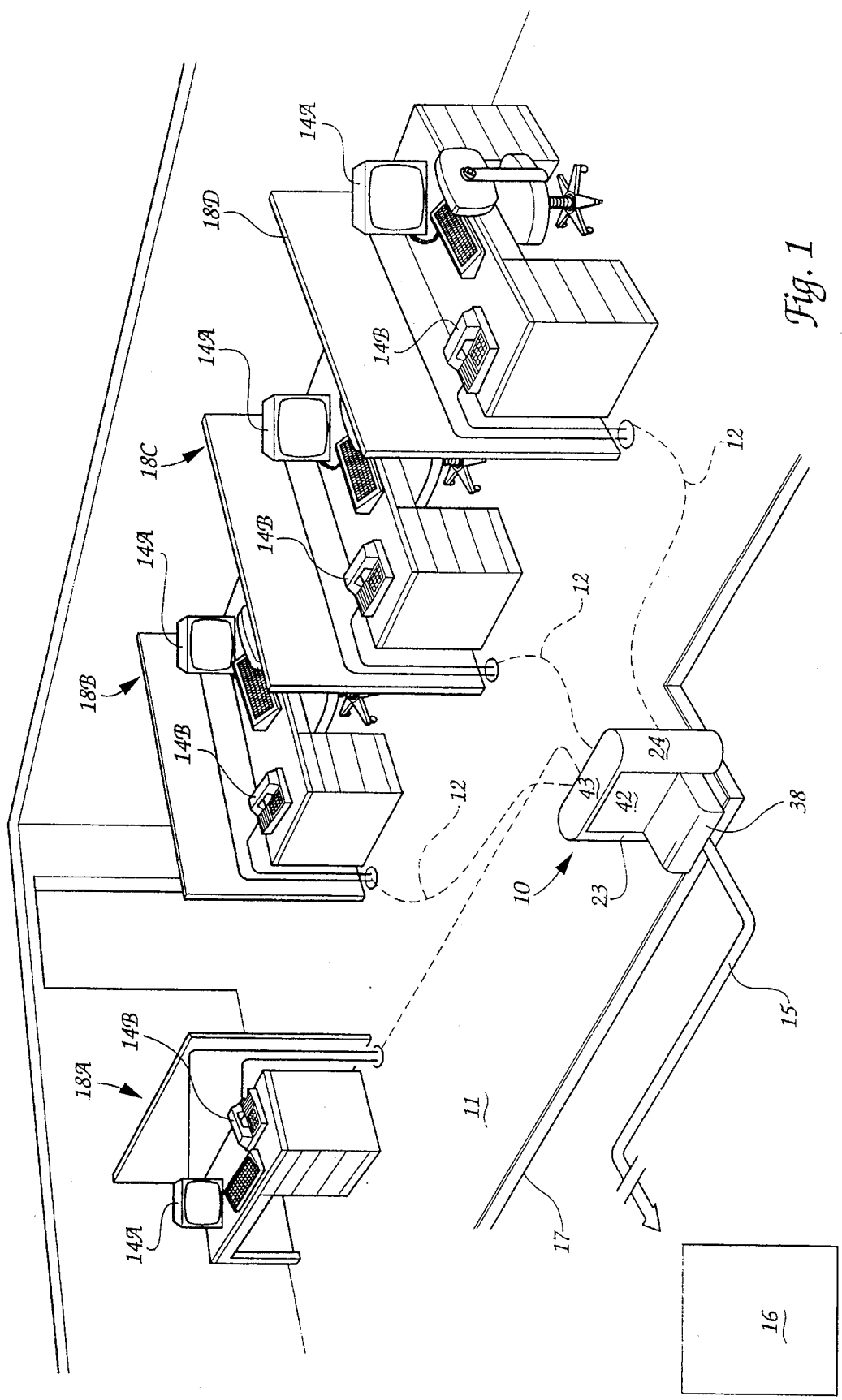
FIG. 1 is an environmental perspective view of the utility center according to one preferred embodiment of the invention.

Referring now specifically to the drawings, a local distribution utility center according to the present invention is illustrated in FIG. 1 and shown generally at reference numeral 10. The utility center 10 is used in combination with a raised floor 11, and through distribution cabling 12, interconnects data and telecommunications equipment 14A and 14B with backbone cabling 15 of a remote wiring closet 16. The backbone cabling 15 and distribution cabling 12 run beneath the raised floor 11 in pathways defined by a space between the raised floor 11 and supporting subfloor 17.

As shown in FIG. 1, the backbone cabling 15 extends from the wiring closet 16 to the utility center 10. The utility center 10 is preferably stationed on the floor 11 of the office near a workgroup.

The "workgroup" is defined herein as any group of co-workers having common needs and interests, and who are located in relatively close proximity to each other. The members of the group communicate frequently with each other, and typically share the same information. The members are generally connected to the same local area network and file server. They generally use the same types of software, and may even share software on the network. They may also share some of the same equipment, such as printers or plotters. A typical workgroup may include between 8–12 workstations 18A, 18B, 18C, and 18D, and may require as many as 32 to 48 data and telecommunications services 14A and 14B.

Figure 2:
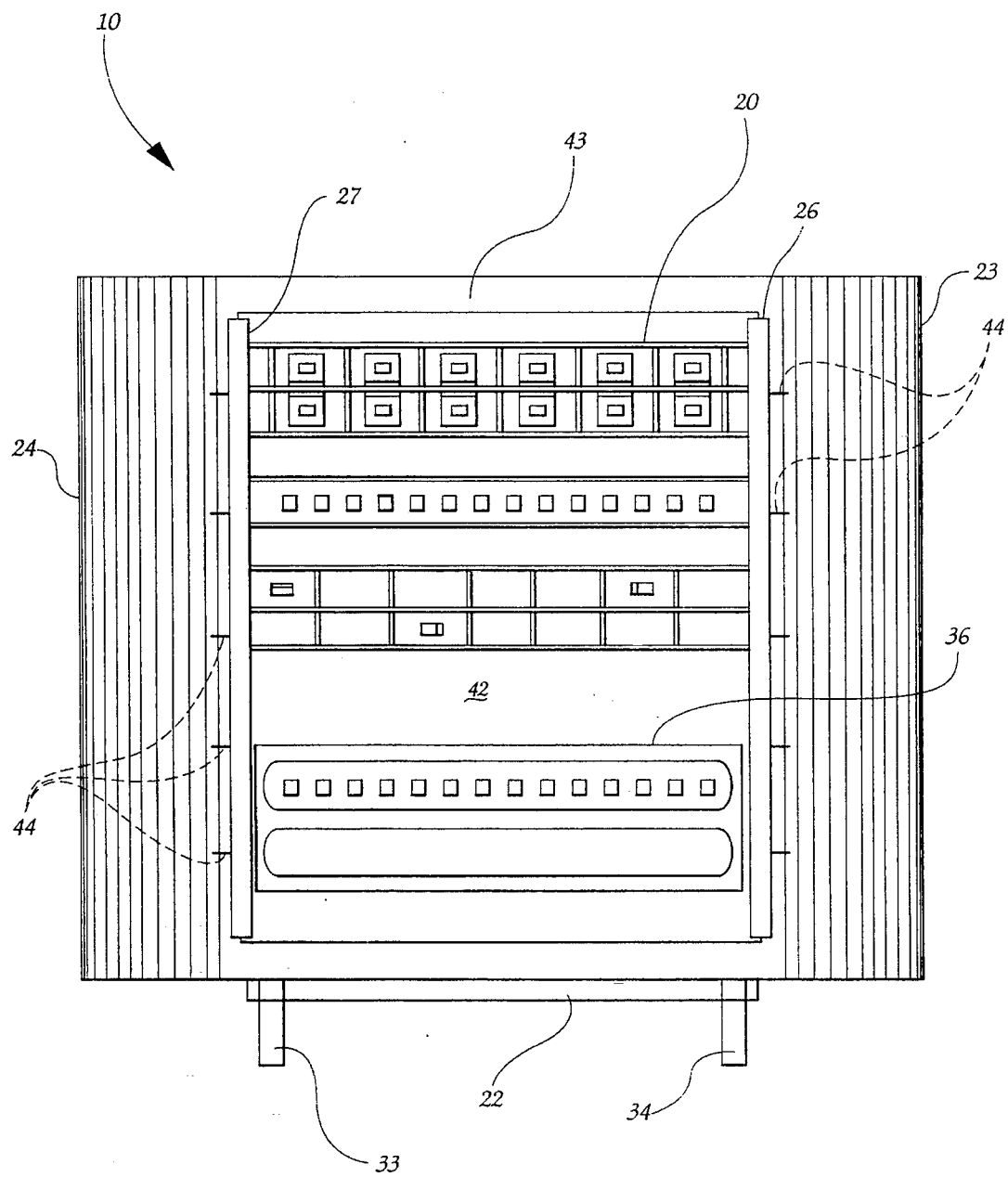
FIG. 2 is a front elevational view of the utility center with the front wall removed to illustrate the distribution panel located within the utility center.
Figure 3:
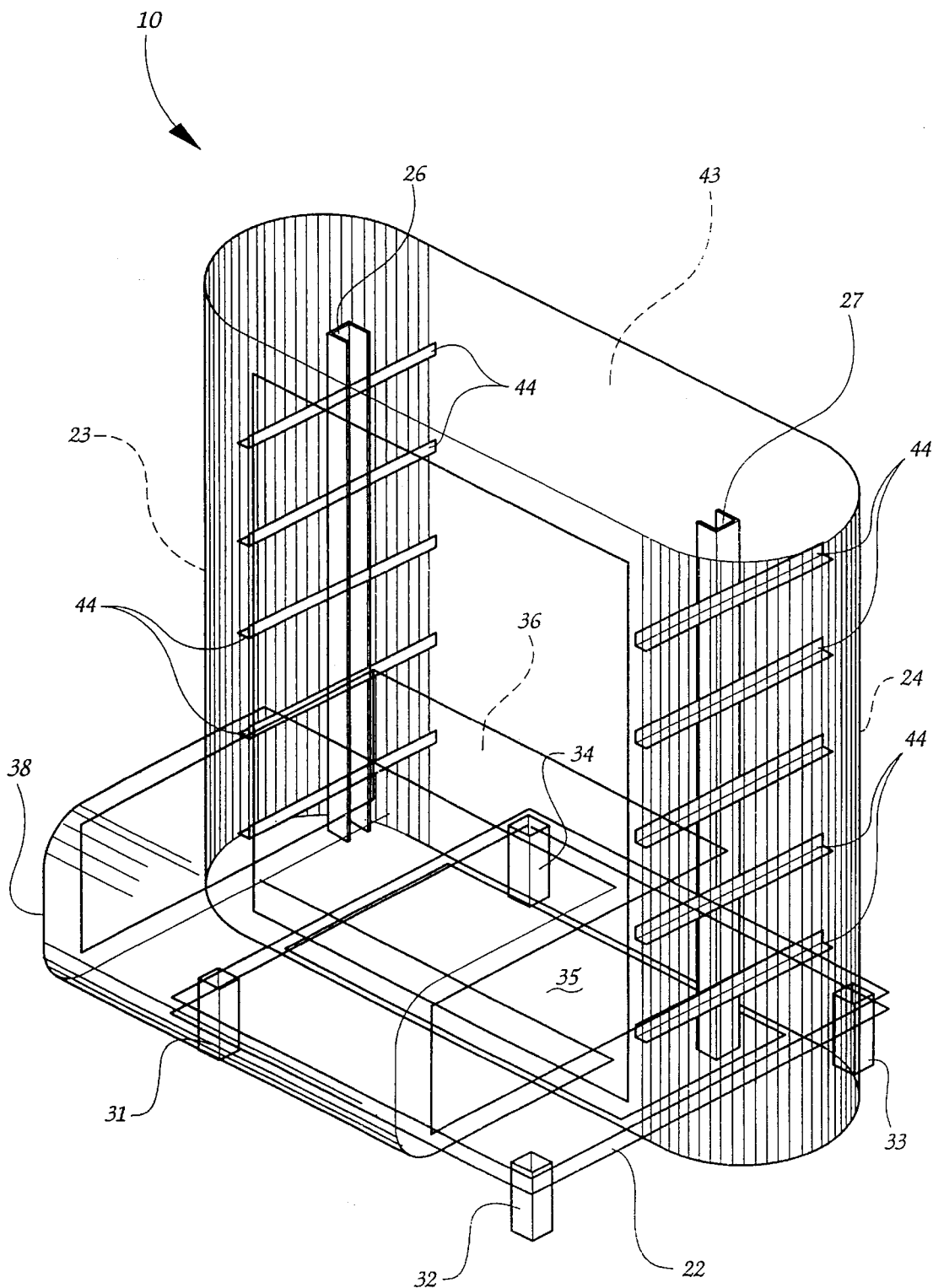
FIG. 3 is a perspective view of the utility center with the distribution panel and front and back walls removed, and showing the side walls and top wall in phantom to illustrate the interior elements of the utility center.

To eliminate the long, fixed cable runs of a conventional structured system to each communications service 14A and 14B, the utility center 10 includes a distribution panel 20, shown in FIG. 2, with modular jacks and other communications ports necessary to service all workstations 18A–18D of the workgroup. The distribution panel 20 is housed directly within the utility center 10, as opposed to the remote wiring closet 16, and may patch into other devices (not shown) located in the utility center 10, such as a backbone interconnection panel, network concentrator, or printer spooler.

The structure of the utility center 10, according to a preferred embodiment, is best illustrated in FIGS. 2–6. The utility center 10 includes a base 22, and first and second side walls 23 and 24 connected to the base 22. Respective U-shaped support rods 26 and 27 are attached to the side walls 23 and 24 for engaging the distribution panel 20 (See FIG. 2) to support the distribution panel 20 within the utility center 10. Preferably, the support rods 26 and 27 are attached to a plurality of horizontal ribs 44 located on the interior of each of the side walls 23 and 24.

The base 22 includes legs 31, 32, 33, and 34 for being mounted directly onto the subfloor 17 of the office to locate the utility center 10 a spaced-apart distance above the subfloor 17. Preferably, the base 22 is dimensioned to form a section of the raised floor 11, and to match the appearance of the raised floor 11. Thus, the utility center 10 can be readily moved to any location in the office by simply interchanging a section of the raised floor 11 and the utility center 10. In addition, because the utility center 10 is part of the raised floor 11, it is securely mounted to the floor 11 and will not be easily tipped over or inadvertently moved.

Figure 4:
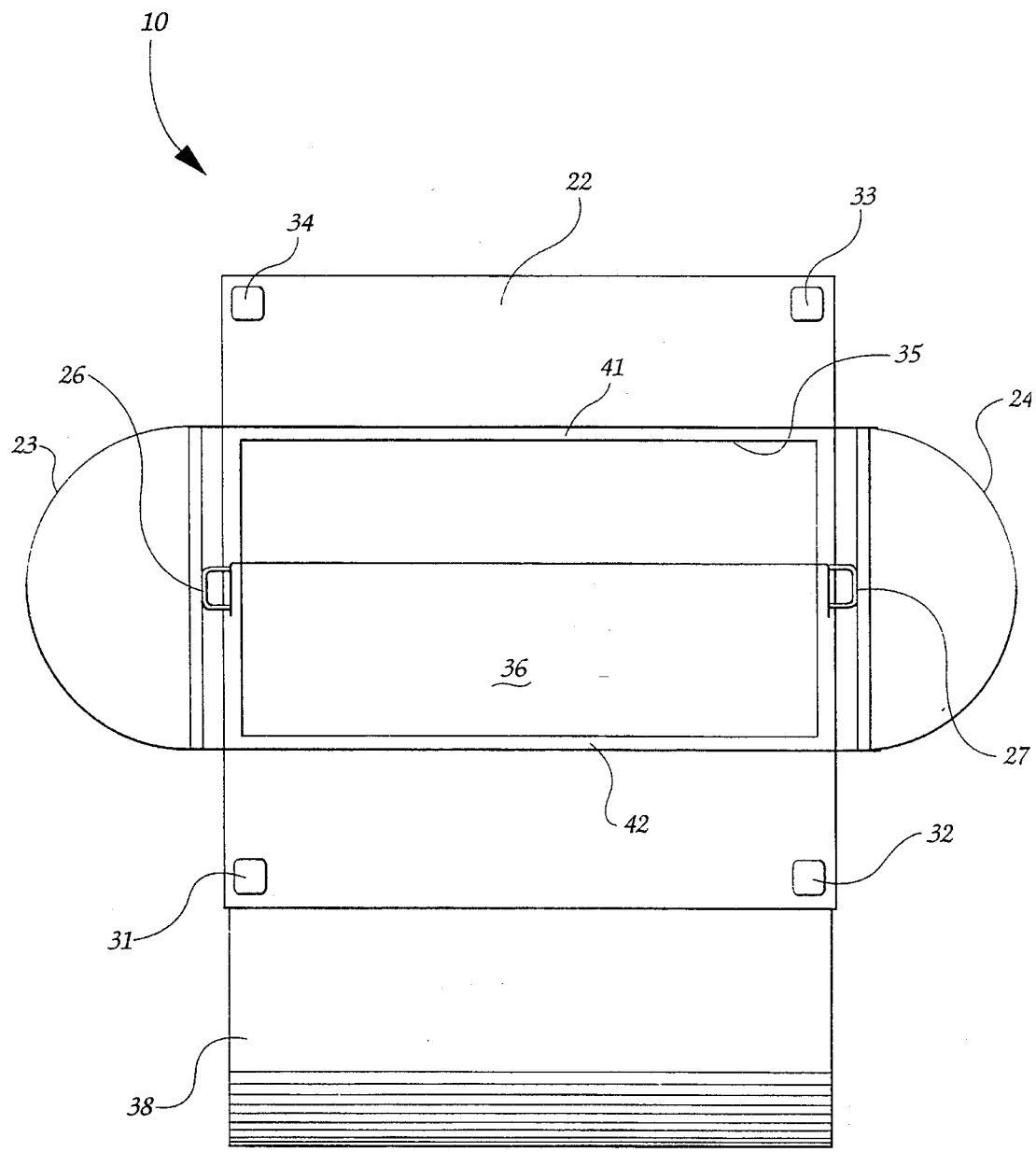
FIG. 4 is a bottom plan view of the utility center.
Figure 5:
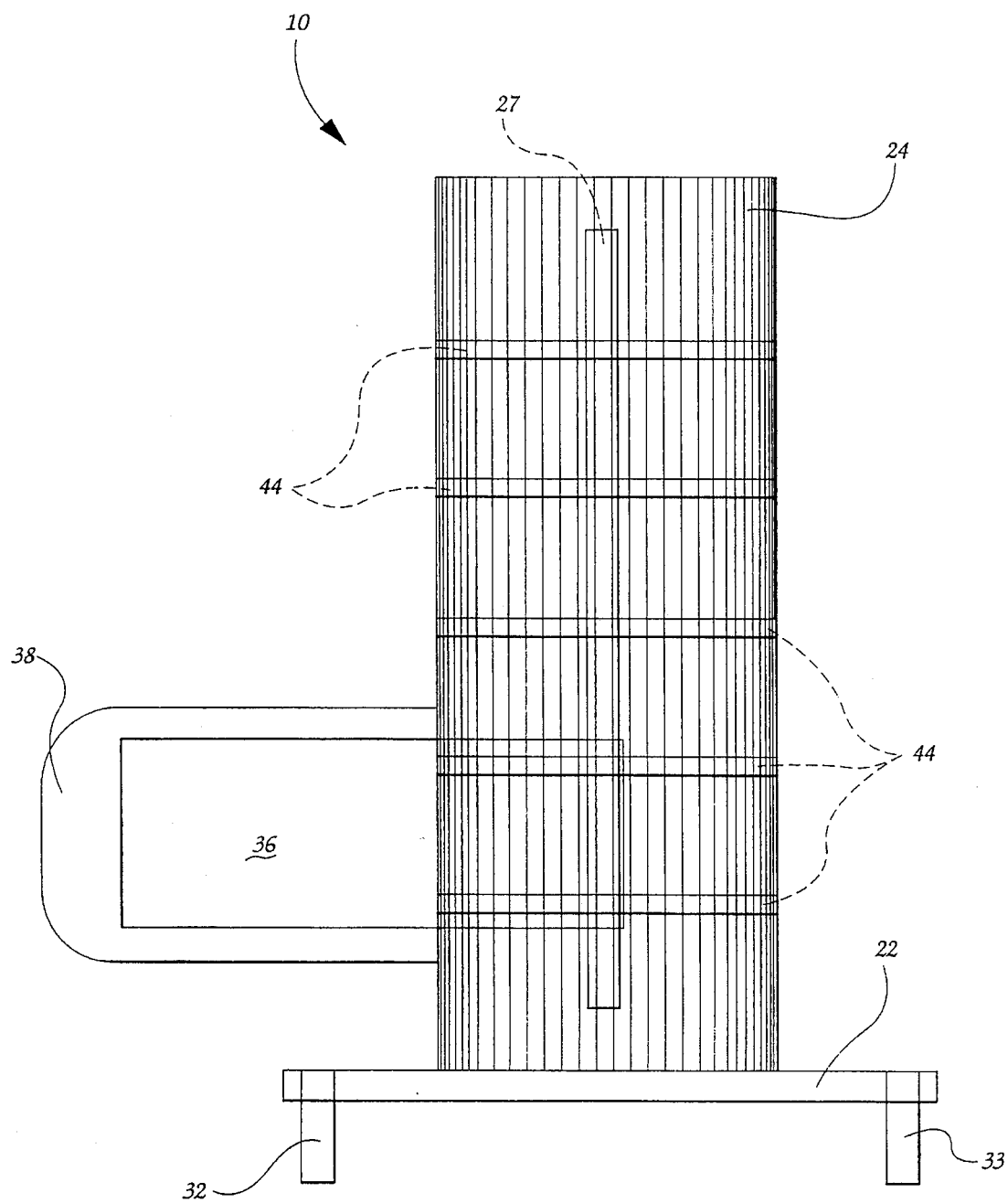
FIG. 5 is a side elevational view of the utility center.
Figure 6:
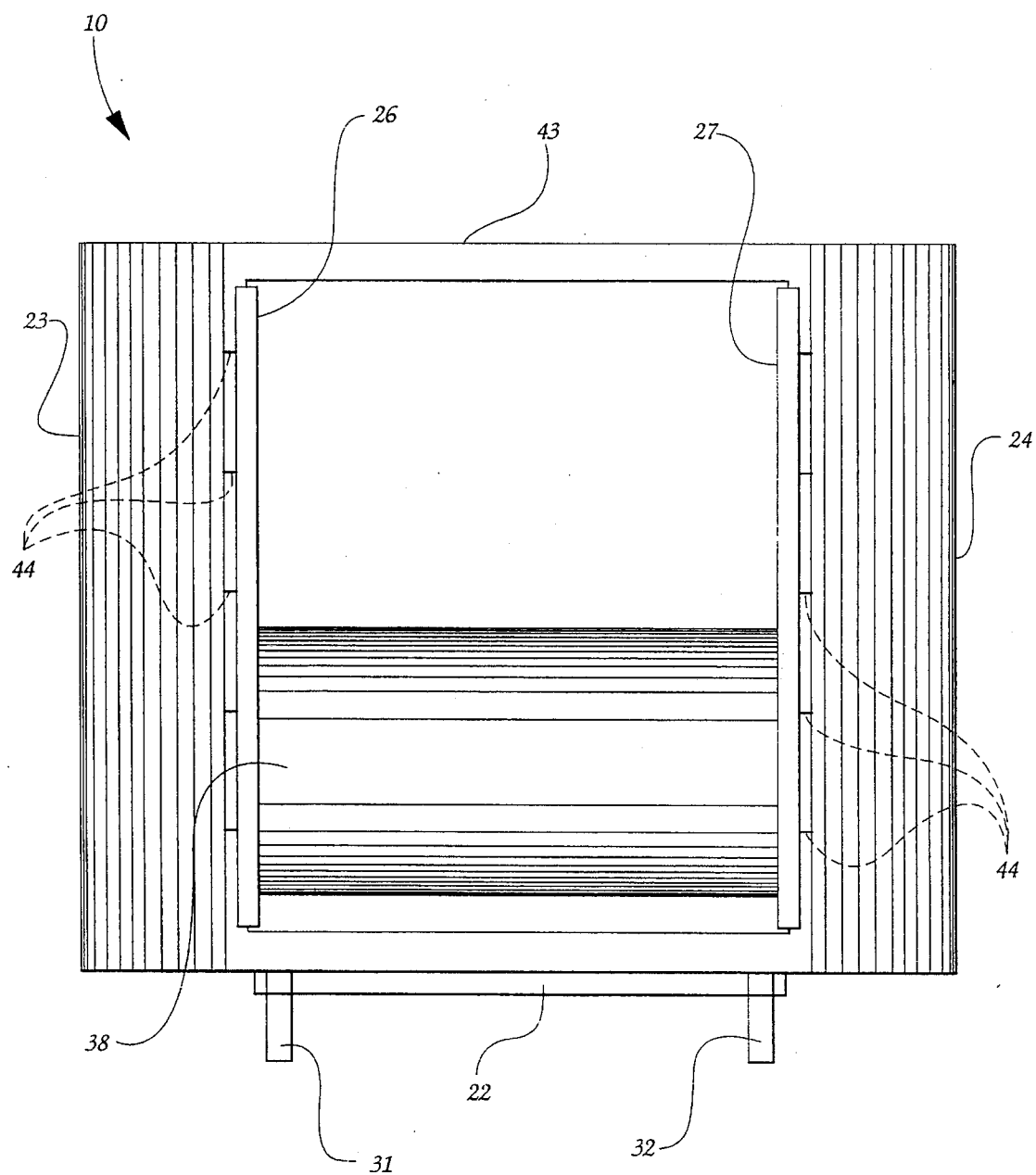
FIG. 6 is a back elevational view of the utility center with the back wall and distribution panel removed.
Figure 7:
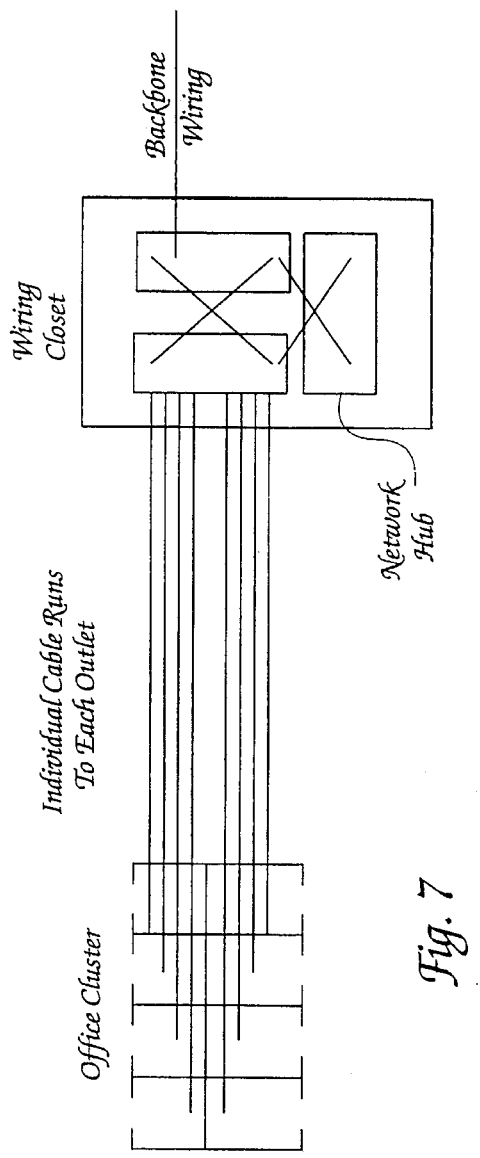
FIG. 7 is a schematic diagram of an office cluster wired according to a prior art structured wiring system with dedicated cable runs from the wiring closet to the workstations.
Figure 8:
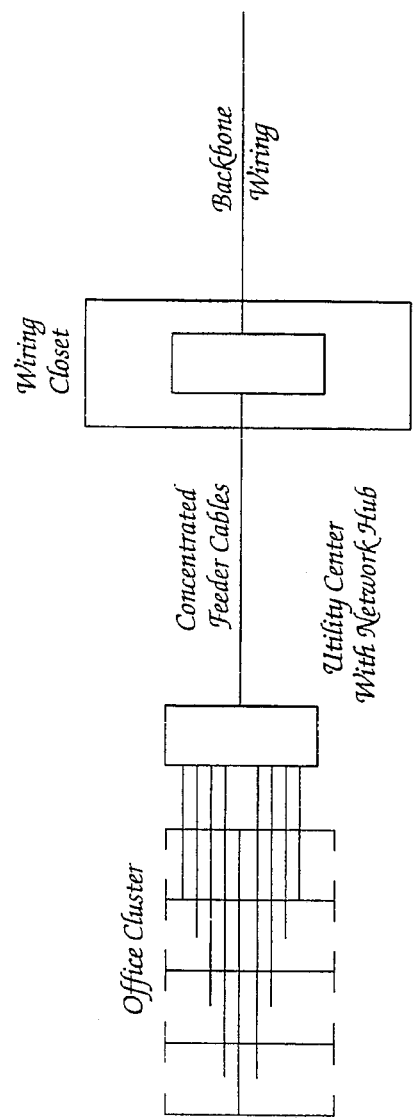
FIG. 8 is a schematic diagram of the office cluster shown in FIG. 7, but wired according to a local distribution wiring system.

As best shown in FIG. 4, an access opening 35 is formed in the base 22 of the utility center 10 for receiving the backbone cabling 15 of the remote wiring closet 16, and for running the distribution cabling 12 from the utility center 10 to the workstations 18A–18D. The backbone cabling 15 connects to jacks and other communications ports of the distribution panel 20. According to one embodiment, the backbone cabling 15 connects to a standard medium attachment unit ("MAU") 36 located within the utility center 10, and carried by a housing 38 removably joined to the utility center 10.

The utility center 10 may further include front and back walls 41 and 42 and a top wall 43 for enclosing the distribution panel 20. Preferably, the front and back walls 41 and 42 are removable to allow easy access to the distribution panel 20 and MAU 36.

In addition to the distribution panel 20 and MAU 36, the utility center 10 may house any other necessary or desired communications attachment units or patch panels commonly known and used in the industry, and which were previously located in the remote wiring closet 16. Preferably, one utility center 10 has the capacity to service an entire workgroup with as many as 16 to 48 communications outlet ports.

A local distribution utility center for a raised floor, and method of providing communications services to a workgroup are described above. Various details of the invention may be changed without departing from its scope. Furthermore, the foregoing description of the preferred embodiment of the invention is provided for the purpose of illustration only and not for the purpose of limitation—the invention being defined by the claims.

We claim:

1. In combination with a raised floor comprising an assembly of floor modules for accommodating data and telecommunications wiring in an area between the raised floor and a supporting subfloor, a removable and transportable utility center located intermediate a communications wiring closet and at least one work station of a work group for distributing wiring to communications equipment of the at least one work station, said utility center comprising:

(a) a self-suoporting base freely positioned on the subfloor and comprising at least one of the assembly of floor module to define a section of the raised floor, said base comprising a top surface and a plurality of attached legs for locating the top surface of the base above the subfloor, and defining an unobstructed space between the top surface of the base and the subfloor for accommodating data and telecommunications wiring and said base including an access opening formed in the top surface of the base for receiving wiring from the communications wiring closet, and for delivering wiring from the utility center to the at least one work station of the work group;

(b) vertical support means connected to said base; and (c) distribution panel means carried by said support means for operatively interconnecting wiring of the wiring closet and the communications equipment of the at least one work station.

2. The combination according to claim 1, and including first and second opposing side walls connected to the base of the utility center.

3. The combination according to claim 2, wherein said vertical support means includes first and second support rods connected to respective side walls of the utility center for carrying said distribution panel means.

4. The combination according to claim 2, and including a top wall connected to the first and second side walls of the utility center.

5. The combination according to claim 2, and including removable front and back walls connected to the first and second side walls of the utility center for allowing convenient access to said distribution panel means.

6. A local distribution utility center for a raised floor comprising an assembly of floor modules positioned on a supporting subfloor, said utility center comprising:
 (a) a self-supporting base for being freely positioned on the subfloor and for comprising at least one of the assembly of floor modules to define a section of the raised floor, said base comprising a top surface and a plurality of attached legs for locating the top surface above the subfloor, and defining an unobstructed space between the top surface and the subfloor for accommodating data and telecommunications wiring, and said base including an access opening formed in the top surface for receiving wiring from the communications wiring closet, and for delivering wiring from the utility center to the at least one work station of the work group;
 (b) vertical support means connected to said base; and
 (c) distribution panel means carried by said support means for operatively interconnecting wiring of the wiring closet and the communications equipment of the at least one work station.

7. A utility center according to claim 6, and including first and second opposing side walls connected to the base of the utility center.

8. A utility center according to claim 7, wherein said vertical support means includes first and second support rods connected to respective side walls of the utility center for carrying said distribution panel means.

9. A utility center according to claim 7, and including a top wall connected to the first and second side walls of the utility center.

10. A utility center according to claim 7, and including removable front and back walls connected to the first and second side walls of the utility center for allowing convenient access to said distribution panel means.

* * * * *